(12) United States Patent
Elsmark et al.

(10) Patent No.: US 8,784,015 B2
(45) Date of Patent: Jul. 22, 2014

(54) PORTABLE POWER DRILL WITH DRILLING IMPLEMENT ROTATING AND FEEDING MEANS

(75) Inventors: Karl Johan Lars Elsmark, Saltsjo-Boo (SE); Lars Peter Johan Kjellqvist, Molnbo (SE)

(73) Assignee: Atlas Copco Industrial Technique Aktiebolag, Stockholm (SE)

( * ) Notice: Subject to any disclaimer, the term of this patent is extended or adjusted under 35 U.S.C. 154(b) by 947 days.

(21) Appl. No.: 12/988,362

(22) PCT Filed: Apr. 8, 2009

(86) PCT No.: PCT/SE2009/000184
§ 371 (c)(1),
(2), (4) Date: Dec. 1, 2010

(87) PCT Pub. No.: WO2009/128760
PCT Pub. Date: Oct. 22, 2009

(65) Prior Publication Data
US 2011/0064532 A1 Mar. 17, 2011

(30) Foreign Application Priority Data
Apr. 18, 2008 (SE) .................................. 0800903

(51) Int. Cl.
*B23B 47/18* (2006.01)
(52) U.S. Cl.
USPC ............. 408/10; 408/128; 408/129; 408/138; 173/145; 173/147
(58) Field of Classification Search
USPC ........... 408/138, 137, 10, 9, 8, 11, 12, 13, 14, 408/15, 17, 128, 126, 135, 129, 124; 173/145.147
See application file for complete search history.

(56) References Cited

U.S. PATENT DOCUMENTS

| | | | | |
|---|---|---|---|---|
| 3,583,822 A | * | 6/1971 | Alexander et al. | 408/11 |
| 3,797,583 A | | 3/1974 | Quackenbush | |
| 3,859,001 A | * | 1/1975 | Hoddinott et al. | 408/3 |
| 4,097,177 A | * | 6/1978 | Close | 408/132 |

(Continued)

FOREIGN PATENT DOCUMENTS

| EP | 0 516 343 A1 | 12/1992 |
|---|---|---|
| EP | 1 249 290 A1 | 10/2002 |

OTHER PUBLICATIONS

International Search Report dated Mar. 7, 2009 issued in International Appln. No. PCT/SE2009/000184.

*Primary Examiner* — Eric A Gates
*Assistant Examiner* — Paul M Janeski
(74) *Attorney, Agent, or Firm* — Holtz Holtz Goodman & Chick PC

(57) ABSTRACT

A portable power drill includes a housing, a drilling implement carrying drive spindle, and a drive motor for rotating and axially feeding the drive spindle. The drive spindle is rotatively and axially displaceable relative to the housing and connected to the drive motor via angle gears, a feed mechanism and two bevel gears supported on the drive spindle. The drive motor is drivingly connected to the drive spindle via a belt drive transmission, a feed shaft, and an angle gear including an axially locked but rotative nut piece. The feed shaft is located in parallel with and coupled to the drive motor via a transmission and drivingly connected to said nut piece. The drive motor is an electric motor controlled and monitored by a programmable control unit.

6 Claims, 1 Drawing Sheet

(56) References Cited

U.S. PATENT DOCUMENTS

| | | | |
|---|---|---|---|
| 4,342,528 A * | 8/1982 | Nozu et al. | 408/6 |
| 4,358,228 A * | 11/1982 | Stark | 408/35 |
| RE31,627 E * | 7/1984 | Evans | 74/89.31 |
| 4,546,834 A * | 10/1985 | Menzel | 173/146 |
| 4,591,299 A | 5/1986 | Eckman | |
| 4,681,490 A * | 7/1987 | Pennison et al. | 408/10 |
| 4,688,970 A * | 8/1987 | Eckman | 408/9 |
| 4,831,364 A * | 5/1989 | Shinohara et al. | 340/680 |
| 4,854,786 A * | 8/1989 | Alexander et al. | 408/1 R |
| 4,890,962 A * | 1/1990 | Nydegger | 408/14 |
| 5,205,681 A * | 4/1993 | Eckman | 408/1 R |
| 5,282,704 A | 2/1994 | Screen | |
| 5,613,810 A * | 3/1997 | Bureller | 408/3 |
| 5,888,033 A * | 3/1999 | Zagar et al. | 408/14 |
| 6,786,683 B2 | 9/2004 | Schaer et al. | |
| 8,317,437 B2 * | 11/2012 | Merkley et al. | 408/9 |

* cited by examiner

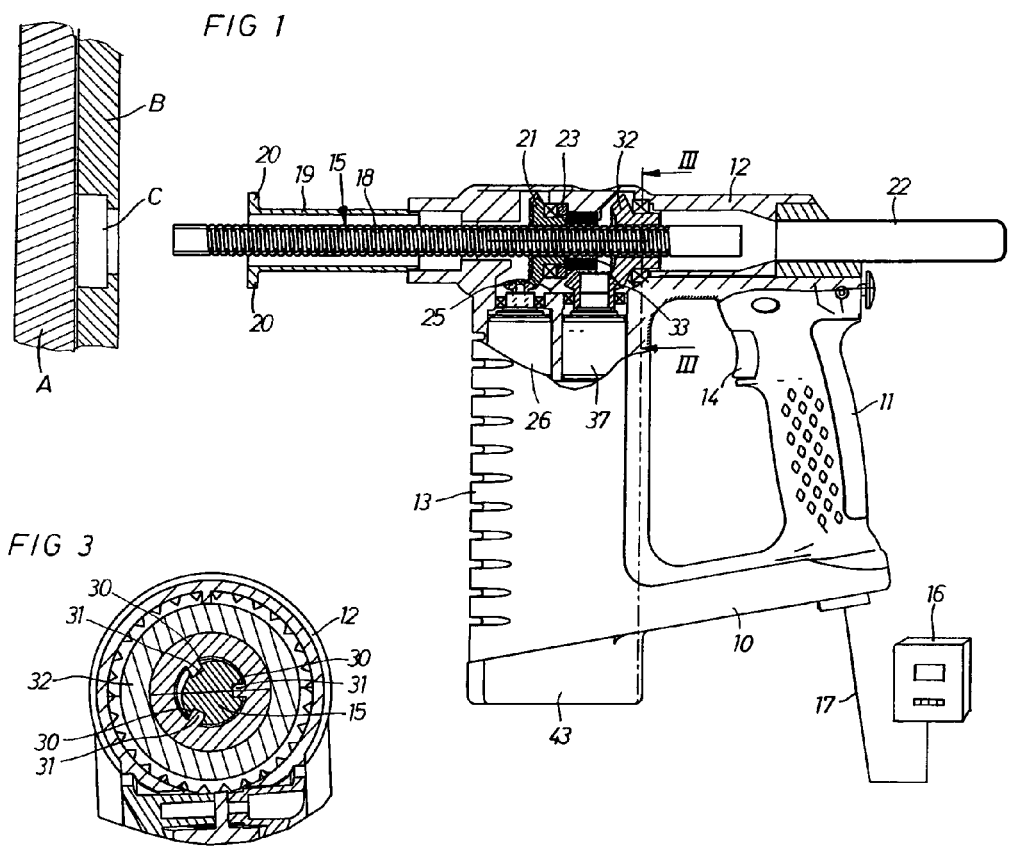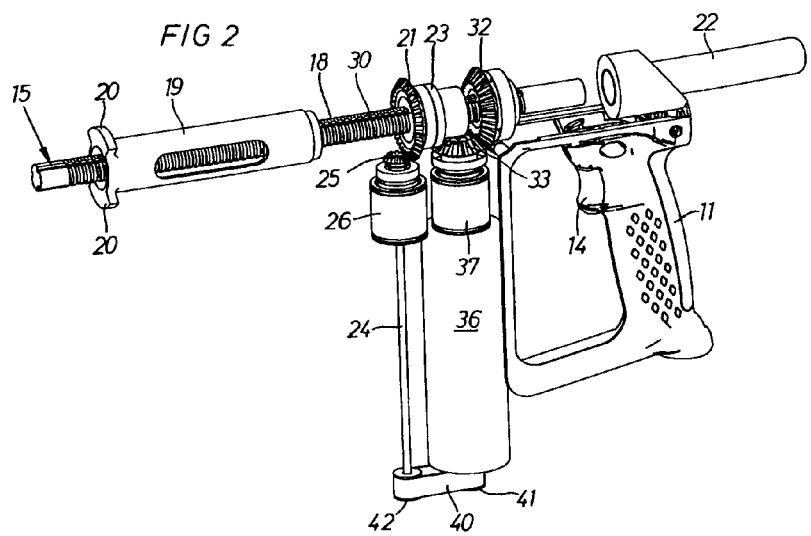

PORTABLE POWER DRILL WITH DRILLING IMPLEMENT ROTATING AND FEEDING MEANS

This application is a U.S. National Phase Application under 35 USC 371 of International Application PCT/SE2009/000184 filed Apr. 8, 2009.

The invention relates to a portable power drill having a power feed drive for feeding a drive spindle and a drilling implement. In particular the invention concerns a power drill having a feed drive coupled to the drive spindle powering means.

Previously known power drills of the above type comprise gearings both for transferring drive torque from a motor to the drive spindle and to activate a screw type feed mechanism. The gearing comprises a spur gear mechanism, and a clutch to engage/disengage the feed mechanism. In these previous power drills the feed rate of the drive spindle is determined by the gear ratio of the gearing, and if the feed rate is to be changed for drilling in different materials the power drill has to be dismantled to change the gear ratio by exchanging one or more spur gears. A power drill of this type is previously described in for instance U.S. Pat. No. 3,797,583.

The above described known type of power drill is not only rather expensive to manufacture but require quite some time to change feed rate, which causes undesirable costs and interruptions in the power drill operations.

It is an object of the invention to provide an improved power drill with a feed drive coupled to the drive spindle drive and, wherein the change of feed rate is facilitated and the manufacturing costs as well as operation costs are considerably reduced.

Further objects and advantages of the invention will appear from the following specification and claims.

A preferred embodiment of the invention is described below with reference to the accompanying drawing.

In the drawing

FIG. 1 shows a side view, partly in section, of a power drill according to the invention.

FIG. 2 shows a schematic view in perspective of the components of the power drill in FIG. 1.

FIG. 3 shows on a larger scale a cross section along line III-III in FIG. 1.

The power drill illustrated in the drawing comprises a housing 10 with a rear handle 11, a drive spindle 15, and a motor casing 13 lodging a drive motor and feed shaft as described below. The handle 11 carries a trigger 14 for maneuvering an on-off function and includes some non-illustrated electronic components for treating signals derived from a feed force and motor angle sensing means as described in further detail below. The electronic components in the handle 11 are connected to an extern operation control unit 16 via a cable 17.

The drive spindle 15 is rotative as well as longitudinally displaceable relative to the housing 10 and carries at its forward end a non-illustrated drilling implement of any commonly available type. The housing 10 is provided with a forwardly extending connection sleeve 19 which is rigidly secured to the housing 10 and formed at its forward end with lock flanges 20 to be connected to a matrix structure B. The latter is firmly secured to the object A to be drilled and is formed with apertures C in a desired pattern to accurately locate the power drill in correct positions for the holes to be drilled. Each aperture C is formed with flanges mating with the flanges 20 of the connection sleeve 19 to form a bayonet-type lock and to transfer feeding force reactions from the power drill to the object being drilled. This is common technique and is not described in further detail. At its rear end the housing 10 is provided with a protective tubular hood 22 by which the drive spindle 15 is protected when in its rear end position.

The drive spindle 15 has a threaded portion 18 extending over the major part of its length for cooperation with a nut piece 21. The latter is formed by an internally threaded bevel gear which is rotative but axially immovable relative to the housing 10 and which is connected to a feed shaft 24 via a pinion 25. The bevel gear/nut piece 21, the pinion 25 and the feed shaft 24 form together a feed mechanism for accomplishing a longitudinal movement of the drive spindle 15. The feed shaft 24, which accordingly is disposed in a right angle relative to the drive spindle 15, is preferably provided with a reduction gearing 26, and between the bevel gear/nut piece 21 and the housing 10 there is provided a force sensing device in the form of a load cell 23 by which a signal is obtained in response to the axial load or feeding force applied on the drive spindle 15.

Moreover, the drive spindle 15 is provided with four longitudinally extending grooves or keyways 30 disposed at 90 degrees angular intervals and intended to cooperate with corresponding splines 31 in a bevel gear 32. The latter is rotatably journalled in the housing 10 and engaged by a pinion 33 connected to the drive motor 36. By the spline/keyway arrangement 30,31 the drive spindle 15 is able to be moved axially while rotatively locked to the bevel gear 32, which means that the drive motor 36 is able to apply a driving torque to the drive spindle 15 via the bevel gear 32 irrespective of axial position and/or movement of the drive spindle 15. The drive motor 36 which preferably is a brush-less electric motor includes a reduction gearing 37 and an angle sensor and is powered by the control unit 16 to accomplish a desired rotation speed of the drive spindle 15.

The feed mechanism further comprises a transmission by which the feed shaft 24 is rotated by the drive motor 36. This transmission comprises a belt drive with a toothed belt 40 cooperating with a first pulley 41 mounted on the rear end portion of the rotor of the drive motor 36 and a second pulley 42 mounted on the feed shaft 24. Accordingly, this feed drive is coupled to the drive motor 36 via a certain gear ratio provided by the belt drive, i.e. the sizes of the pulleys are decisive for the feed shaft speed in relation to the drive spindle speed and hence the feed rate. The belt drive is protected by a cover 43 attached to the lower part of the housing 10. For changing the relationship between the drive motor speed and the feed velocity, i.e. changing the gear ratio between the drive motor and the spindle shaft 24 the cover 43 may easily be removed and the pulleys 41 and 42 are exchanged for another pair of pulleys which together provides a lower or higher gear ratio. Compared to the rebuilding of the feed gearing of prior art devices as described above this modification of the belt drive is very simple and very quickly performed.

The above mentioned operation control unit 16 is a stationary unit located at working site and is connected to the power drill via the cable 17. The control unit 16 comprises a voltage converter by which the drive motor 36 is supplied with electric power of variable voltage and frequency. The control unit 16 also comprises an electronic programmable operation control and monitoring means in which are stored one or more sets of drilling parameter values by which the drilling operations shall be performed to accomplish acceptable results when drilling in different materials. Each parameter set comprises parameter values for drive spindle rotation speed suitable for drilling a particular material or a combination of two or more materials. The control unit is also programmed with limit values for the operation parameters, and a means for comparing received signals responsive to the actual angular positions and speed of the drive motor, the feed force etc. with the stored limit values and to give indications as to whether the limit values have been overrun or not, i.e. whether the drilling operation has been performed in an acceptable way.

In operation, the power drill is connected to the control unit 16 via the cable 17 for receiving power according to a selected set of operation parameter values and for delivering back actual operation related signals. The drive spindle 15 is provided with a suitable drilling implement, and the connection sleeve 19 is brought into a locking engagement with a drilling matrix aperture C. When the power drill is safely locked to the matrix B the trigger 14 is pulled by the operator and the drilling operation is started.

Depending on the structure and material of the work piece A to be penetrated by drilling a suitable parameter set is chosen from those initially stored in the control unit 16. The material of work piece A could homogeneous, i.e. comprise just one single material with a non-changing properties throughout the work piece, which means that a parameter set with a certain drive spindle speed is chosen suitable to give an optimum drilling operation, both regarding efficiency and acceptable result. The parameter set is also chosen with regard to the size of the hole to be drilled and the type drilling implement used. Since the feed velocity is determined by the drive motor speed, the transmission gear ratio and the pitch of the drive spindle thread an individual control of the feed is not possible.

The drive motor 36 is provided with an angle encoder by which the rotational movements of the motor and hence the drive spindle are accurately measured. The speed of the motor 36 is accurately determined by the control unit 16 by controlling the voltage and frequency magnitudes of the supplied power. This makes it possible to have the control unit 16 control the operation very accurately throughout the drilling process. By using the signals from the angle encoder of the drive motor 36 it is possible to continuously calculate the drive spindle positions, because the feed movements of the drive spindle 15 corresponds directly to the drive motor operation. By the result of this calculation it is possible to make momentary changes in the parameter values of the supplied power. It is also possible to determine whether a drilling operation has been performed as expected by continuously analysing the torque momentarily applied during the operation in view of the momentary movement and/or position of the drive spindle as well as the axial feeding force applied on the drive spindle 15. The actual feeding force is indicated by the load cell 23. This gives in turn a possibility to make retrievable and to store the drilling data for each drilled hole for post drilling analysis of the result and quality of the performed drilling operation.

The crucial feature of the invention is the use of an electric motor for the drive spindle rotation as well as for feed movements, particularly a brush-less motor fed with electric power of variable frequency and voltage magnitude according to programmed parameter sets, because that type of motor makes it possible to control the process momentarily and very accurately to compensate for instantaneous variations in feed and rotation resistance experienced during each drilling operation. For instance, torque peaks occurring at the initial contact between the drilling implement and the work piece as well as sudden torque drops at full penetration of the work piece are easily compensated by momentary adaptations of the power parameter values. The possibility to obtain very fast changing of power parameter values according to programmed parameter sets or to occurring changes in the ongoing drilling operation makes it possible also to adapt momentarily the drilling parameters to work pieces comprising two or more materials in a sandwich-type compositions so as to obtain accurate drilling data all the way through the work piece. The control unit 16 is programmed to keep the speed of the drive motor 36 constant by keeping the supplied frequency constant and momentarily adapt the output voltage to compensate for occurring changes in the torque resistance on the drilling implement.

So, by continuously monitoring the torque resistance and axial load on the drive spindle 15 the control unit 16 is able to detect the initial contact between the drilling implement and the work piece as well as the very moment when the drilling implement penetrates through the work piece at completed operation. This means that a reverse movement of the drive spindle may be automatically initiated, and since the control unit 16 also calculates continuously the axial position of the drive spindle 15 it is also possible to accomplish an automatic shut off of the drive and feed shafts as the rear end position of the drive spindle 15 is reached during reverse movement of the latter.

The invention claimed is:

1. A portable power drill comprising:
    a housing;
    a drive motor;
    a rotative drive spindle configured to carry a drilling implement and being axially displaceable relative to the housing for feeding movements;
    a coupling for transferring rotational movement from the drive motor to the drive spindle irrespective of axial displacement of the drive spindle; and
    a feed mechanism for axially displacing the drive spindle;
    wherein the feed mechanism comprises:
        a threaded portion of the drive spindle;
        a nut piece rotative but axially immovable relative to the housing and arranged to cooperate with said threaded portion; and
        a feed shaft located in parallel with and coupled to the drive motor via a transmission and drivingly connected to said nut piece;
    wherein said transmission comprises:
        a belt drive provided with a toothed flexible belt;
        a first pulley arranged on the drive motor; and
        a second pulley arranged on the feed shaft; and
    wherein said first and second pulleys are exchangeable to change a rotation speed of said feed shaft in relation to a speed of the drive motor.

2. The power drill according to claim 1, wherein the drive motor comprises an electric motor connected to an electronic operation control and monitoring unit, and wherein said control and monitoring unit is programmed with one or more suitable operation parameter values for controlling an operation of the drive motor.

3. The power drill according to claim 2, wherein said control and monitoring unit is programmed with one or more operation parameter limit values corresponding to parameter values obtained at correctly performed drilling operations, and wherein said control and monitoring unit comprises means for comparing actually obtained operation parameter values with said limit values and for indicating whether the actually obtained parameter values are within said limit values.

4. The power drill according to claim 3, wherein said feed mechanism comprises a load sensing device arranged to deliver a signal in response to a feed force applied on the drive spindle.

5. The power drill according to claim 2, wherein said feed mechanism comprises a load sensing device arranged to deliver a signal in response to a feed force applied on the drive spindle.

6. The power drill according to claim 1, wherein said feed mechanism comprises a load sensing device arranged to deliver a signal in response to a feed force applied on the drive spindle.

* * * * *